United States Patent [19]
Hillerich, III et al.

[11] Patent Number: 6,139,451
[45] Date of Patent: Oct. 31, 2000

[54] REINFORCED WOOD BAT

[75] Inventors: John A. Hillerich, III, Louisville, Ky.; George W. Burger, Rockline, Calif.

[73] Assignee: Hillerich & Bradsby Co., Louisville, Ky.

[21] Appl. No.: 09/288,082

[22] Filed: Apr. 5, 1999

Related U.S. Application Data

[63] Continuation-in-part of application No. 08/657,362, Jun. 3, 1996, Pat. No. 5,904,803.

[51] Int. Cl.$^7$ .................................................. A63B 59/06
[52] U.S. Cl. ........................................... 473/564; 473/567
[58] Field of Search .................................... 473/564–568, 473/519, 520, 457

[56] References Cited

U.S. PATENT DOCUMENTS

| | | |
|---|---|---|
| 1,499,128 | 6/1924 | Shroyer, Jr. . |
| 1,611,858 | 12/1926 | Middlekauff . |
| 2,069,723 | 2/1937 | Morrow ................................. 473/564 |
| 3,025,062 | 3/1962 | Duffin . |
| 3,115,912 | 12/1963 | Harris . |
| 3,116,926 | 1/1964 | Owen . |
| 3,129,003 | 4/1964 | Mueller et al. ........................ 473/564 |
| 3,353,826 | 11/1967 | Traverse . |
| 3,598,410 | 8/1971 | Costopoulos . |
| 3,727,295 | 4/1973 | Gildemeister . |
| 3,749,621 | 7/1973 | Shoffner . |
| 3,779,551 | 12/1973 | Wilson . |
| 3,811,596 | 5/1974 | Wilson . |
| 3,813,272 | 5/1974 | Straughan . |
| 3,819,370 | 6/1974 | Komiya . |
| 3,861,682 | 1/1975 | Fujii . |
| 3,955,816 | 5/1976 | Bratt . |
| 3,963,239 | 6/1976 | Fujii . |
| 4,134,587 | 1/1979 | Diederich . |
| 4,148,482 | 4/1979 | Harwell, Jr. . |
| 4,241,919 | 12/1980 | Foreman . |
| 4,644,630 | 2/1987 | Blum . |
| 4,737,380 | 4/1988 | Shane . |
| 4,744,136 | 5/1988 | Foreman . |
| 4,763,899 | 8/1988 | Hundley . |
| 4,780,158 | 10/1988 | Thomas . |
| 4,844,460 | 7/1989 | Mitchell . |
| 5,009,730 | 4/1991 | Tozier . |
| 5,114,144 | 5/1992 | Baum . |
| 5,301,940 | 4/1994 | Seki . |
| 5,458,330 | 10/1995 | Baum . |
| 5,460,369 | 10/1995 | Baum . |
| 5,672,227 | 9/1997 | Chiu . |
| 5,759,660 | 6/1998 | Coulis . |

FOREIGN PATENT DOCUMENTS

| | | |
|---|---|---|
| 962291 | 2/1975 | Canada . |
| 1138912 | 1/1983 | Canada . |
| 58-134710 | 8/1983 | Japan . |

*Primary Examiner*—Mark S. Graham
*Attorney, Agent, or Firm*—Middleton & Reutlinger; Charles G. Lamb

[57] ABSTRACT

A reinforced wood bat has a solid wood core with the same as standard wood bats but with slightly smaller dimensions. The barrel may include a plurality of grooves in the hitting zone. One or more continuous, uninterrupted layers of a conformable fabric sleeve, constructed of high strength fibers, snugly fitting over substantially the entire outer surface of the core forms a preformed bat assembly. The fabric sleeve is dimensioned to expand slightly over the barrel of the core and compress over the handle of the core. A fiberglass braided sleeve, with strands initially aligned at about +45°/−45° orientation, is preferred. When the braided sleeve strands are tensioned over the handle portion, they align more longitudinally, and tend to lock, which significantly increases the reinforcing strength in the handle portion of the bat. An epoxy resin, which self-cures at or near room temperature, laminates and bonds the sleeve layers to the wood core to the full size dimension specified for wood bats. The preferred braided sleeve can be applied to the wood core using a hollow application tube, which applies the sleeve to the wood core in double layers, while at the same time aligning the fabric strands in the desired orientations. A molding technique heat shrinks conventional high shrink plastic tubing into close fitting contact with the preformed bat assembly. The shrunk tubing then serves as the mold for laminating and bonding the fabric sleeve layers to the core with the curable resin.

16 Claims, 6 Drawing Sheets

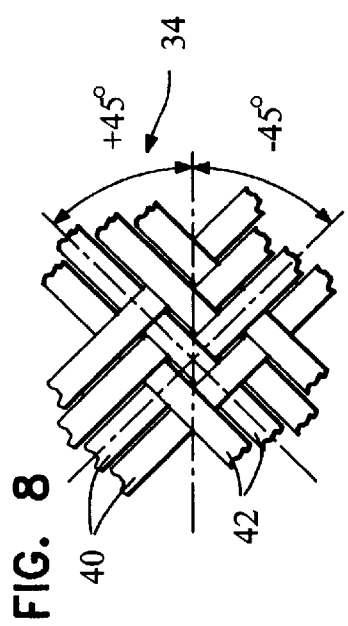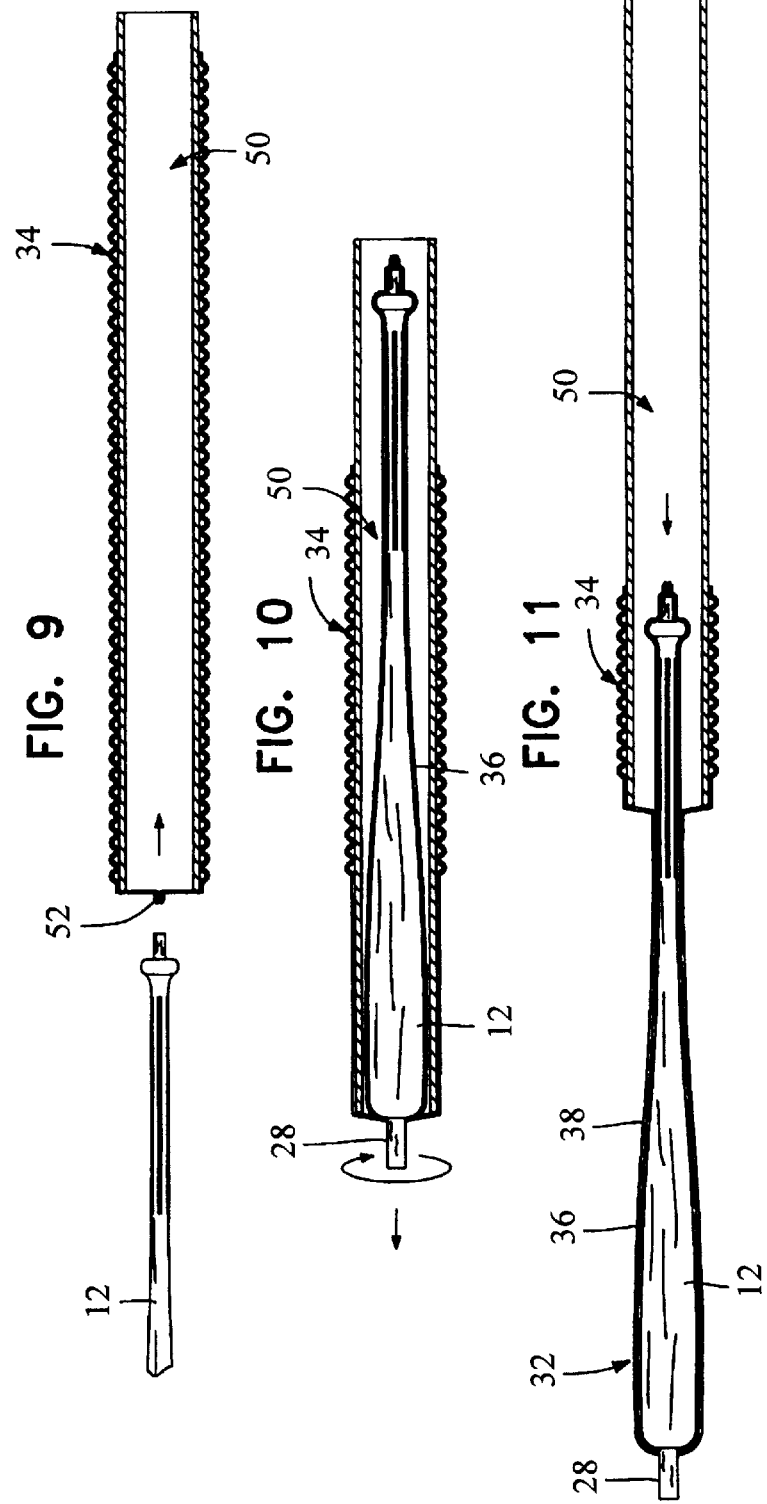

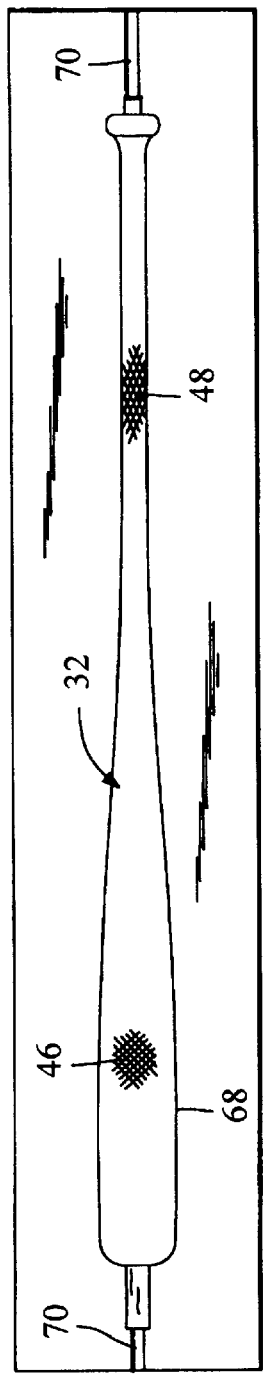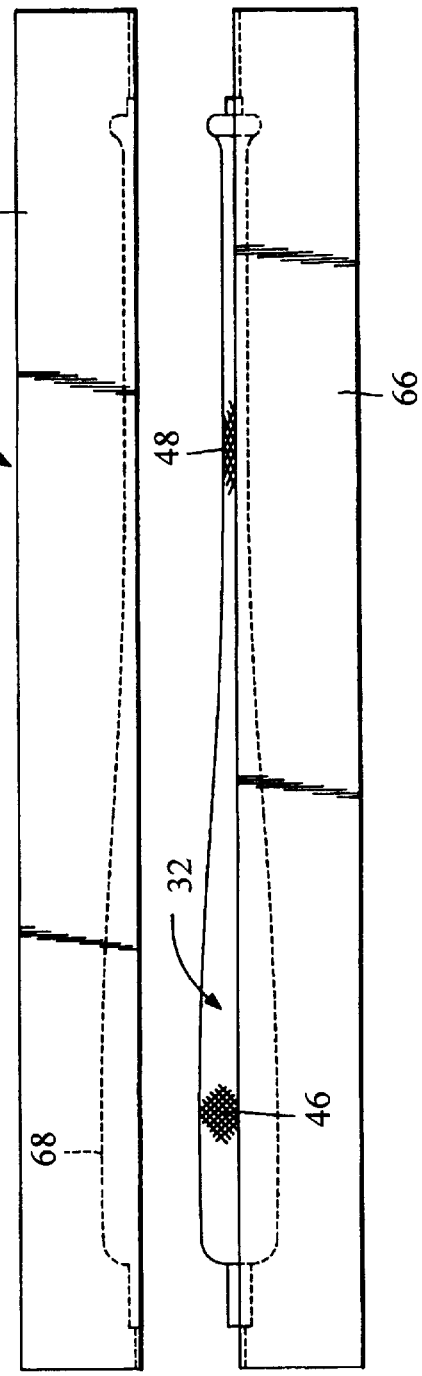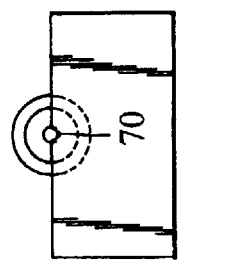

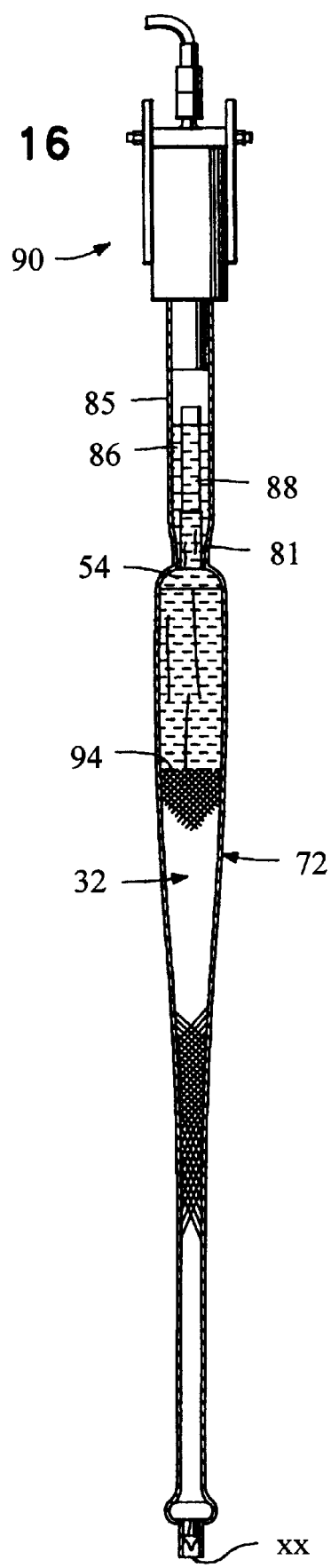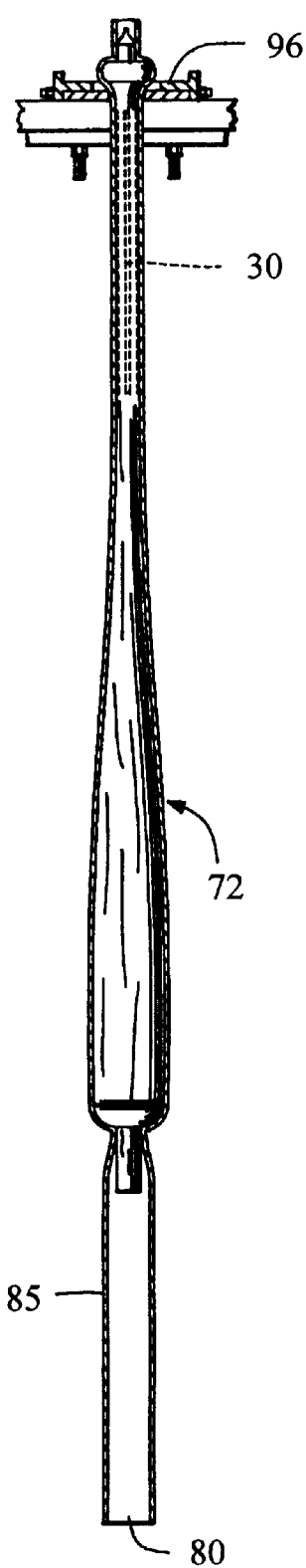

REINFORCED WOOD BAT

RELATED APPLICATION

This application is a continuation-in-part application to application Ser. No. 08/657,362, filed Jun. 3, 1996, U.S. Pat. No. 5,904,803 incorporated herein by reference.

BACKGROUND OF THE INVENTION

1. Field of the Invention

The present invention generally relates to wood bats for striking a baseball, softball or the like that are reinforced around their outer surface and methods for their manufacture. More specifically, the present invention is directed to solid wood bats and methods for making solid wood bats that are reinforced around their periphery from the knob or butt end to the top or outer end with a covering of composite material, including high strength fibers and resin, laminated to the external surface of a wood core. The fiber strands in the barrel portion of the reinforced bat are in the form of a diagonal mesh and the fiber strands in the handle portion are more lengthwise of the bat.

2. Description of the Prior Art

Baseball and softball bats have been constructed of wood since the inception of organized baseball games and leagues. Wood bats have been made using conventional lathe techniques and standard external dimensions have been developed along with standard weight characteristics. Also, hollow aluminum bats have been developed and are used by many younger players and are required by certain regulations relating to certain leagues and age groups. Additionally, hollow plastic bats have been developed which are used by younger age groups for practice and training with the hollow plastic bats being normally used with lightweight hollow plastic balls, rubber balls and the like.

U.S. Pat. Nos. 1,499,128; 1,611,858; 3,116,926; 3,727,295; 3,779,551; 3,811,596; 3,861,682; 3,955,816; 3,963,239; 4,241,919; 4,744,136; 4,763,899; 4,844,460; and 5,114,144 and Canadian Patent Number 962291 disclose various developments in ball bats.

The primary drawback of solid wood bats is that they are relatively expensive and they frequently break in use. Therefore, substantial efforts have been undertaken over the past many years to develop a reinforced wooden bat which has the desired weight, size, strength, stiffness and flexibility for superior performance characteristics within the allowable weight and size parameters, but has a longer life than either the standard solid wood bat or extruded aluminum bats. For example, approved wood bats can be no more than 2.75 inches in diameter.

One such prior effort is disclosed in Mueller U.S. Pat. No. 3,129,003 in which a fiberglass sleeve is pressed tightly on the handle portion of the wood bat and a plastic coating is applied to the sleeve to fix the sleeve in place. In Baum U.S. Pat. No. 5,114,144, layers of resin impregnated knitted or woven cloth made from high strength fibers are applied to a central core in the shape of a bat made from foamed plastic or extruded aluminum. An outer layer of resin coated wood veneer is applied and the composite is placed within split molds which are pressed together while the resin is allowed to set to form a unitary mass. Costopoulos U.S. Pat. No. 3,598,410 discloses a wooden bat comprised of a plurality of individual laminae spirally wrapped in surface grooves with a high tension multi-fiber filament. Finally, Seki U.S. Pat. No. 5,301,940 discloses a resin injection technique to apply a continuous reinforcing fiber and molding material to the outside surface of a bat core prepared using a meltable material or a foamed resin.

None of the prior art patents, however, discloses a reinforced wood bat having the characteristics of the present invention. Specifically, the prior art does not disclose a reinforced solid wood bat which has a continuous sleeve constructed of high strength fibers resin bonded to substantially its entire outer surface. Further, the prior art does not disclose an arrangement in which a braided sleeve is applied to a solid wood core in at least two layers substantially covering the entire outer surface of the bat. In addition, the prior art does not disclose an arrangement in which a predetermined standard size of wood bat is formed by a cut down wood core having slightly smaller dimensions and a composite high strength sleeve that is bonded to the surface of the cut down wood core in order to return the completed bat to the standard dimension size specified for the original wood bat.

SUMMARY OF THE INVENTION

In accordance with the present invention, a cut down solid wood core having the same shape as a wood bat is prepared with slightly smaller dimensions than the standard dimension size specified for conventional wood bats. The wood core is prepared with the lathe support extensions or studs left thereon. The core is then covered with one or more layers of a continuous conformable fabric sleeve formed from strands of high strength fibers, preferably a fiberglass braided sleeve, to form a preformed bat assembly. Each layer of the fabric sleeve is applied in forming the preformed bat assembly to snugly fit over substantially the entire outer surface of the wood core and to align the strands to substantially increase the longitudinal strength of the braid along the handle portion of the bat. An appropriate curable resin, preferably an epoxy resin which self-cures at or near room temperature, is then applied to the high strength fiber sleeve layers of the preformed bat assembly and cured to laminate and bond the sleeve layers to the core in a size dimension equal to that specified for wood bats.

In the preferred embodiments of the invention, the fiberglass braided sleeve, or other conformable fabric sleeve, has a substantially uniform diameter. The uniform internal diameter of the sleeve is slightly smaller than the diameter of the core in the barrel portion and substantially greater than the diameter of the core in the handle portion. The sleeve is also capable of expanding in diameter upon force in the radial direction and to contract in diameter upon tension or twisting in the longitudinal direction. Preferably, the sleeve has its strands aligned at about a +45/−45° orientation to its longitudinal axis.

Accordingly, when a layer of the sleeve is applied over the core, the sleeve expands slightly over the core in the barrel portion, thus causing the strands to tend to increase their orientation to greater than +45/−45°. Meanwhile, when each sleeve layer is in position around the outer periphery of the wood core, the core can be twisted or rotated with respect to the sleeve to place the sleeve under tension in the longitudinal direction. This twisting causes the sleeve to contract and snugly fit around the outer or top end of the bat. Similarly, the strands in the handle portion are tensioned or twisted to cause the sleeve to compress and snugly fit around the handle portion of the bat. Importantly, this tensioning and contraction of a braided sleeve around the handle portion of the wood core alters the fiber strand orientation along the handle portion. In fact, it has been discovered that when using a braided sleeve the fabric strands assume an orientation much closer to the longitudinal axis of the bat in the handle portion and become essentially locked with respect to each other. This more longitudinal and locked orientation significantly increases the tensile strength of the braided sleeve along the longitudinal axis of the handle, where the bat is otherwise the weakest. When laminated and bonded to the core with the curable resin, this favorable strand orientation becomes molded into the bat. Such an arrangement significantly enhances the strength qualities of the bat.

The present invention also includes a unique method for making the novel wood bat described herein. Generally, the method starts out with the formation of the solid wood bat core from a standard bat billet using conventional bat forming equipment such as a lathe or the like. However, for the present invention, the wood core is turned down to slightly smaller dimensions than prescribed for a standard wood bat over its entire surface in order to accommodate the fiberglass sleeve layers. In addition, the lathe support extensions or studs are left on.

Several longitudinal grooves are then cut symmetrically around the wood core along the handle portion to assist in applying the curable resin in accordance with the present invention. Preferably, the wood core is treated to drive out air from the wood and a resin primer is applied to the core surface. The preformed bat assembly is then formed by applying one or more layers of the continuous fiberglass braided sleeve onto the wood core by use of a hollow application tube. Preferably, two layers of the fiberglass sleeve are applied. This is accomplished in accordance with the present invention by placing the sleeve on the outside of the application tube, with one end of the sleeve closed over the open mouth of the tube.

The handle end of the wood core is pushed into the open end of the application tube while restraining the braided sleeve as is it comes off the exterior of the tube and onto the core. This restraint puts the sleeve under longitudinal tension as it goes over the handle portion of the core and causes the braid to elongate and snugly fit over the handle portion. When the core is all the way into the tube, the core is turned by using the barrel end support extension as a handle. This turning action forces the sleeve to draw in on the outer end of the core into contact with the circular base of the extension where it meets with the barrel end of the bat.

This drawing in of the sleeve around the outer end of the core allows the core to be withdrawn from the tube without the sleeve becoming loose or falling off, while at the same time dispensing a second layer of the fiberglass sleeve over the first layer. The end of the second layer now extending over the knob is then tensioned so as to draw in the second layer on the handle portion of the core and first layer. The preformed bat assembly is now ready for further processing.

In accordance with the present invention, a preferred molding technique involves the heat shrinking of conventional high shrink plastic tubing into close fitting contact with the preformed bat assembly. The shrunk tubing can then serve as the mold for laminating and bonding the fiberglass sleeve layers to the core with curable resin. The tubing is also preferably shrunk with a suitable tubular extension at the barrel end to serve as a receptacle for receiving and holding the resin as it is slowly fed into the tubular mold to wet-out the fiberglass sleeve layers prior to curing. Because of the differential between the diameters of the handle portion and the barrel portion of the bat, it has been discovered that the method of shrinking the plastic mold tubing down onto the preformed bat assembly requires not only heating and shrinking of the plastic mold tubing during the heat shrinking process, but also simultaneous stretching. This simultaneous stretching has been found necessary in order to sufficiently shrink the mold tubing around the handle portion of the preformed bat assembly.

The curable resin is next slowly fed into the tubular mold, preferably through the shrink wrap tube extension, in order to wet-out the fiberglass sleeve layers. Also, preferably, an elongated piece of ash wood is inserted into the resin in the tube extension to act as a heat sink. Air pressure is also preferably applied to force the resin to wet-out the fiberglass sleeve layers of the preformed bat assembly in a reasonable period of time.

After the fiberglass sleeve layers have been wetted out, the preformed bat assembly in the plastic tubular mold may be turned upside down and held by a fitting which holds the bat just below the knob. By so doing, the uncured resin and fiberglass better fill the handle/knob interface. Once the resin has cured, the plastic tubular mold or heat shrink wrap is removed. The extension supports are then cut off and the exposed bat ends are dressed. The handle is then either sand blasted or sanded to give it a rougher texture.

It is therefore an object of the present invention to provide a reinforced wood bat for striking a baseball, softball or the like which is constructed from a wood bat core that is the same shape and configuration as a conventional wood bat but has external dimensions slightly less than the standard size conventional wood bat and a reinforcing composite laminant containing high strength fibers bonded to substantially all of the external surface of the wood core to form a finished bat having the same external dimensions as a standard size conventional wood bat.

Another object of the present invention is to provide a reinforced wood bat as set forth in the preceding object in which the reinforcing composite laminant is one or more continuous, uninterrupted layers of a fabric sleeve formed from strands of high-strength fibers impregnated with a clear curable resin which co-acts with the wood core to provide a wood bat having substantially the same appearance and impact characteristics as a conventional wood bat but is subject to significantly less breakage and damage due to contact with batted balls. In fact, actual testing to date of bats of the present invention has resulted in virtually no broken bats.

Yet another object of the present invention is to provide a reinforced wood bat as set forth in the preceding objects in which at least two continuous, uninterrupted layers of a reinforcing braided sleeve constructed of fiberglass strands are bonded to substantially the entire outer surface of the wood core.

A further object of the present invention is to provide a reinforced wood bat in accordance with the preceding objects in which the high strength fiberglass strands are oriented toward the longitudinal, or 0°, axis of the bat in the handle portion and oriented in an approximately +45°/−45° diagonal mesh in the ball impacting barrel portion of the bat to provide enhanced impact resistance in the barrel portion and enhanced break resistance in the handle portion of the bat.

Still another object of this invention is to provide a reinforced wood bat as described in the preceding objects in which lathe support extensions assist in applying and orienting the fiberglass strands onto the wood core and in laminating and bonding the reinforcing composite laminate to the wood core.

A still further object of the present invention is to provide a reinforced wood bat as described in the preceding objects in which longitudinally extending grooves are cut symmetrically around the handle portion of the bat to improve the bonding of the reinforcing composite laminate to the wood core.

Yet a further distinct object of this invention is to provide a method of making a reinforced bat in which the wood core in the shape of a bat is formed with smaller external dimensions and one or more continuous layers of a fiberglass sleeve are positioned over substantially the entire core to form a preformed bat assembly. The preformed bat assembly is then placed in a mold, curable resin is applied to the fiberglass sleeve layers, and the resin cured to bond and laminate the fiberglass layers to the exterior of the bat core thereby forming a completed reinforced wood bat that has external dimensions exactly the same as a conventional wood bat.

A still further object of the present invention is to provide a method of making a reinforced wood bat using a preformed bat assembly in which the wood core is formed in a conventional manner including the lathe support extensions or studs extending longitudinally from each end of the wood core and at least two layers of a fiberglass braided sleeve are stretched over substantially the entire external surface of the wood core by using an application tube and twisting the core with the support extension as a handle. The fiberglass sleeve is then impregnated with a curable resin, which is then cured to laminate and securely bond the reinforcing sleeve to the wood core to form an integral bat structure.

Yet another object of this invention is to provide a method of making a reinforced bat in which a mold for applying a preferred epoxy resin to a preformed bat assembly having glass fibers positioned on the surface of a wooden bat core is formed from high heat shrink tubing by simultaneously stretching and heat shrinking the high shrink plastic tubing into close fitting contact with the preformed bat assembly to form a plastic tubular mold, while at the same time forming a hollow tube extension for inserting the curable resin into the tubular mold and for applying head pressure to force the resin to wet out the glass fibers before curing.

Still yet another object of the present invention is to provide a method of making a reinforced wood bat in accordance with the preceding object in which a heat sink is inserted in the hollow tube extension of the plastic tubular mold after the epoxy resin has been poured therein in order to slow the exothermic reaction of the epoxy resin and allow sufficient time for the resin to wet out the glass fibers of the preformed bat assembly before curing.

A further object of the present invention to be specifically set forth herein is to provide a method of making a reinforced wood bat in accordance with the two preceding objects in which the plastic tubular mold containing the preformed bat assembly with the glass fibers wetted out with the epoxy resin is turned upside down and held by fittings which hold the bat just below the knob in order to force the uncured resin and glass fibers to better fill in the handle/knob interface.

A final object is to provide a plurality of circular grooves in the barrel portion to add more resin to the barrel end of the bat to help extend the bat life. These grooves can have transverse transitions or radiused edges inside and outside.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 8 is an enlarged, front view of a section of a braided sleeve in accordance with the present invention showing the preferred braid pattern.

FIG. 9 is a side elevation view, partially in cross-section, showing the application tube in accordance with the present invention with the wood core ready to be inserted in order to receive a first layer of the fiberglass sleeve.

FIG. 10 is a side elevation view, partially in cross-section, showing the wood core fully inserted in the application tube with the first layer of the fiberglass sleeve snugly tightened on the outer surface of the wood core by twisting the support extension at the outer tip end of the bat, and ready to receive a second layer.

FIG. 11 is another side elevation view, partially in cross-section and similar to FIGS. 9 and 10, in which the wood core is being removed from the application tube thereby applying a second layer of the fiberglass sleeve on the outer surface.

FIG. 12 is a plan view of a bottom half of a mold in which the preformed bat assembly of wood core and glass fiber sleeve layers is placed for applying the curable resin laminating reagent.

FIG. 13 is a side elevational view illustrating schematically the two halves of a conventional mold and cavity illustrating the association of the mold with the preformed bat assembly and the injection ports for injecting the curable resin into the mold to impregnate the sleeve layers.

FIG. 14 is an end elevational view of the bottom half-mold and preformed bat assembly as illustrated in FIG. 12.

FIG. 16 is a side elevational view illustrating schematically an apparatus for wetting the fiberglass layers as an epoxy resin moves downwardly over the preformed bat assembly in the plastic tubular mold, with an ash wood heat sink in place in the resin.

FIG. 17 is also a side elevational view, this time illustrating schematically an apparatus for supporting the preformed bat assembly in the plastic tubular mold and the fiber layers wetted out with the epoxy resin by fittings just below the bat knob.

DESCRIPTION OF THE PREFERRED EMBODIMENTS

Figure 1:
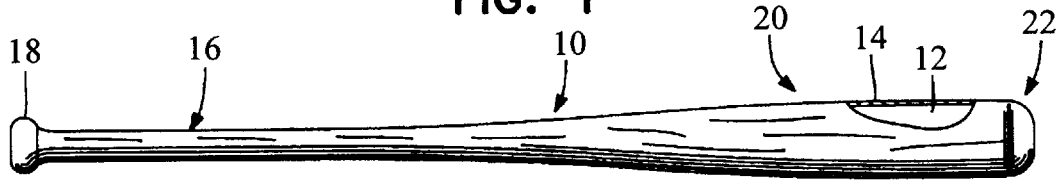
FIG. 1 is an elevational view of the reinforced wood bat of the present invention with a portion of the barrel broken away to illustrate the composite laminant on wood core.

In describing the preferred embodiments of the present invention, such as illustrated in the drawings, specific terminology will be resorted to for the sake of clarity. However, the invention is not intended to be limited to the specific embodiments illustrated and described and terms so selected; it being understood that each specific term includes all technical equivalents which operate in a similar manner to accomplish a similar purpose.

Referring now to FIG. 1, the reinforced bat of the present invention is generally designated by reference numeral 10 and includes a wood core 12 and a composite laminant 14. The composite laminant 14 is formed of one or more continuous, uninterrupted layers of a conformable fabric sleeve which covers substantially the entire outer surface of the wood core 12. The sleeve is constructed of high strength fiber or fibers, preferably glass fibers, also known as fiberglass, and preferably in the form of a woven braid. The braided sleeve is impregnated with a curable resin which bonds and laminates the reinforcing layer or layers to the external surface of the wood core 12.

The bat 10 is also constructed in a manner to conform with standard dimensional characteristics and standard physical characteristics of a conventional wood bat. More specifically, conventional wood bats are constructed in various standard lengths with standard weight characteristics and standard external diameter and tapering characteristics. The bat 10 is constructed to conform to such standard characteristics. As is conventional, the bat 10 includes a handle portion 16 with a knob 18 on the end thereof with the handle portion tapering outwardly and merging into a barrel portion 20 which terminates in a tip or outer end 22.

Figure 2:
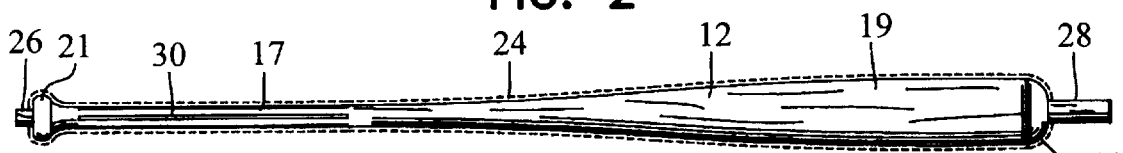
FIG. 2 is an elevational view of the wood core for the present invention with the broken line illustrating the original size of a conventional standard size wood bat.

The wood core 12 is formed in the conventional manner of a wood bat by the use of conventional lathe operations, and also includes a handle portion 17, a barrel portion 19, and a knob 21 at the end of the handle portion. However, as illustrated in FIG. 2, the wood core 12 is formed with external dimensions slightly less than the external dimensions of a conventional wood bat. In FIG. 2, the broken line indicated by reference number 24 defines the outline of a conventional wood bat thereby illustrating that the wood core 12 is formed with slightly less external dimensions as compared to the dimensions of the conventional standard size wood bat. When the laminant 14 is bonded to the wood core 12, the external dimensions of the completed reinforced wood bat 10 are the same as a standard size conventional wood bat. Preferably, the lathe operation turns down the wood core approximately 1/10 of an inch over its entire length from standard wooden bat dimensions. Thus for standard wood bats having a diameter of approximately 2.50 inches, the diameter of the wood core 12 in the barrel portion 19 is preferably about 2.35–2.40 inches.

In addition, when the cut down wood core 12 is formed in the lathe operations, it is formed to leave intact specifically dimensioned, longitudinal lathe support extensions or studs 26 and 28, which extend axially out of each end of the core 12, as shown in FIG. 2. The outer end extension or stud 28 is sufficiently sized to serve as a handle in the construction of the bat 10. Preferably, extension 28 is about 1 inch in diameter and about 2–3 inches long. Extension 26 on the knob end can be much smaller and is on the order of ¾ inches in diameter and ½ inch in length. Longitudinal grooves 30 are cut in the wood core 12 along the handle portion 17. These grooves serve to assist in wetting out or impregnating the layer or layers of the fiberglass sleeve along the handle portion of the core. Preferably, the grooves are symmetrically placed around the circumference of the handle and extend from about 1½ inches short of the knob down the length of the bat for about 15 inches, or more. The grooves 30 can be any effective size and shape. Four grooves about 0.06 inches×0.06 inches square symmetrically spaced around the handle have been found satisfactory.

Figure 3:
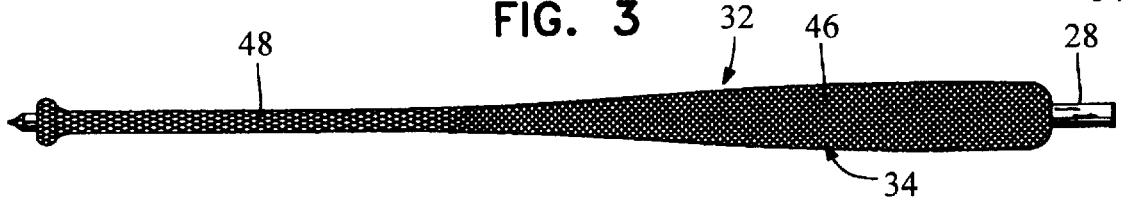
FIG. 3 is an elevational view of the preformed bat assembly for the present invention with the preferred two fiberglass braided sleeve layers stretched over the wood core.

The preformed bat assembly is illustrated in FIG. 3 and generally designated by the numeral 32. The assembly 32 is formed by covering substantially the entire outer surface of the wood core 12 with one or more continuous, uninterrupted layers of a conformable fabric sleeve generally designated by the numeral 34. Preferably, two continuous, uninterrupted layers of a fiberglass braided sleeve are snugly fitted over core 12, designated by the numerals 36 and 38 in FIGS. 6 and 7. Although two continuous layers are preferred, one continuous layer may suffice, or three or more layers may be utilized depending upon the density of the fiberglass strands and the tightness of the weave in the braid or sleeve.

The sleeve 34 has a generally constant diameter and is braided or formed so that the strands are generally perpendicular to each other and at a generally 45° angle to the longitudinal axis of the core 12, or +45°/−45°. For the purpose of this invention, zero degree strand orientation is parallel to the longitudinal axis of the wood core 12 or bat 10, and a 90° orientation is axially around the core or bat in a plane perpendicular to the longitudinal axis. A strand which is oriented plus 45° or minus 45° lies in a plane which is at a 45° angle to the longitudinal axis of the core or bat and a +45° plane is perpendicular to a −45° plane.

Figure 4:
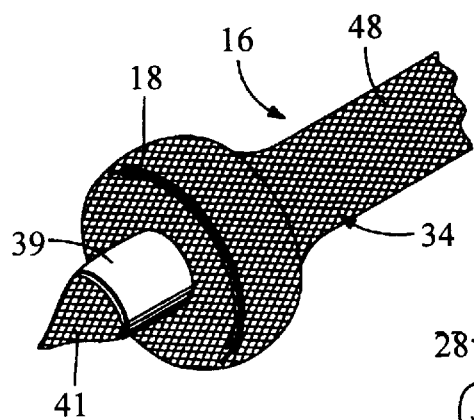
FIG. 4 is an enlarged perspective view of the knob and handle portion of the preformed bat assembly illustrated in FIG. 3.
Figure 5:
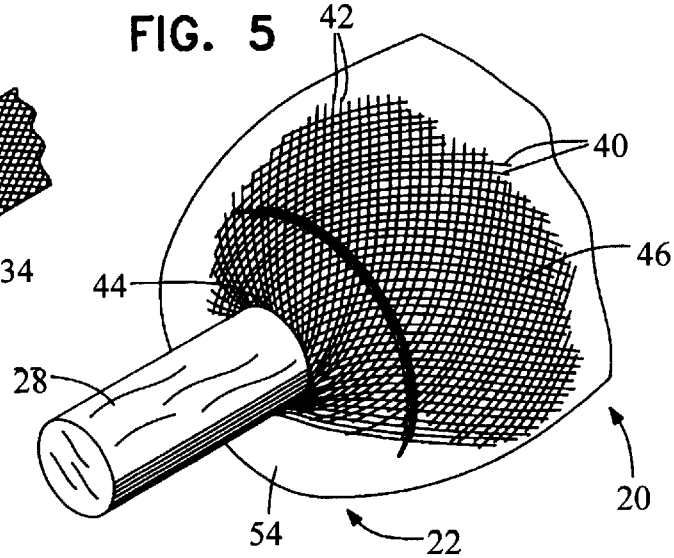
FIG. 5 is an enlarged perspective view of the barrel or outer end of the preformed bat assembly illustrated in FIG. 3.

The preferred +45°/−45° orientation of the strands is illustrated in FIG. 8 where strands and 42 are generally is perpendicular to each other and are generally in a +45°/−45° orientation to the longitudinal axis of the sleeve 34. These strands 40 and 42 are illustrated in FIGS. 3, 4 and 5 as solid lines for simplicity in the drawings. The preferred form for the fiberglass sleeve 34 for a bat having a 2.50 inch barrel diameter is a braid having an inner diameter of about 2.25 inches, which is slightly less than the greatest diameter of the core 12, preferably about 2.35–2.40 inches. A preferred braid has a weight and density of about 26.5 feet per pound and 9 ounces per square yard and is made and sold by A & P Technology of Covington, Kentucky.

While a braided sleeve made of fiberglass ends or strands is the preferred construction for sleeve 34 in order to form layers 36 and 38 of the present invention, a woven or knitted sleeve made of fiberglass and/or other high strength fiber strands can also be used within the scope of this invention. The woven or knitted sleeve can also be formed either with or without a longitudinal seam. Therefore, for the purpose of this invention, the term "sleeve" is intended to encompass not only the preferred braided sleeve, but also any woven, knitted and other fabric which can be constructed in a continuous, uninterrupted conformable sleeve of fiberglass and/or other high strength fibers.

As previously stated, the preferred fiberglass sleeve 34 has an internal diameter slightly less than the outer diameter of the barrel portion 19 of the wood core 12. Hence, the sleeve 34 expands slightly as it is pulled over the barrel portion 19. This tight fitting engagement between the sleeve 34 and the barrel 19 tends to ensure that the generally +45°/−45° orientation of the fiberglass strands 40 and 42 remains intact, or increases slightly, along the barrel portion 19 of the core 12. This generally +45°/−45°, or more, orientation in the barrel portion 19, is illustrated by the numeral 46 in the preformed bat assembly 32 in FIG. 3, and in the enlarged segment in FIG. 5.

On the other hand, the sleeve is not normally in close fitting contact with the core at its tip end 54 or along its handle portion 17. By rotating the core 12, the sleeve 34 is drawn in on the core 12 at the tip end 54. The drawing in of the sleeve 34 at the tip end 54 is illustrated in FIG. 5 of the drawings. It will there be seen that the contracted sleeve layers cover the entire surface of the tip end 54 except where the base 44 of support extension 28 extends axially from the tip end of core 12. This covering and fitting of the sleeve layer around the top of the tip end 54 and snugly around the base 44 of extension 28 is accomplished in a unique way in accordance with the present invention, but can be achieved in any manner which substantially covers the tip end of the core.

Meanwhile, tensioning a braided sleeve 34 over the handle portion 17 of the core causes the sleeve to stretch in the longitudinal direction over the handle portion. This stretching causes the fiber strands 40 and 42 in the handle portion to orient in a more longitudinal direction, as shown by the numeral 48 in FIGS. 3 and 4. This more longitudinal direction for the fiber strands 40 and 42 in the handle portion is substantially less than the normal +45°/−45° orientation of the braid as shown in FIG. 8. Thus, it has been discovered that utilization of one or more continuous, uninterrupted layers of a braided sleeve of glass fibers or other high strength fibers, preferably in a +45°/−45° orientation, which has an internal diameter equal to or slightly smaller than the barrel portion of the wood core, has significant advantages in producing the laminated bat of the present invention. More specifically, when the braided sleeve is applied to the wood core, the greater diameter of the barrel causes the glass fiber strands to expand beyond their natural +45°/−45° orientation to an orientation equal to or slightly greater than +45°/−45°.

Then, as the layers 36 and 38 are assembled on the core and the sleeve layers are stretched to draw in on the handle portion of the core, the strands are forced into a substantially more longitudinal orientation significantly less than +45°/−45°. This change of orientation of the strands toward a 0° orientation significantly increases the longitudinal strength of the strands, thus increasing the reinforcing effect of the glass fibers in the handle portion of the bat. Further, the stretching and drawing in of the braided sleeve tend to cause the strands in the handle portion to substantially lock against each other, thus further increasing the strength of the strands in the longitudinal direction. The preferred orientation of the strands in the handle portion of the bat, when locking occurs, is approximately +20°/−20° to approximately +25°/−25°.

As part of the present invention, it has been discovered that continuous, uninterrupted layers of the preferred fiberglass braided sleeve can be easily and quickly applied to substantially the entire outer surface of the core 12 in making the preformed bat assembly 32 by use of a hollow application tube. This methodology is schematically illustrated in FIG. 9, 10 and 11, with the application tube generally designated by the numeral 50. The layers are preferably applied in pairs by selecting sufficient length of the sleeve to comprise at least two layers. The sleeve 34 is then placed on the outside of the application tube 50, the inside diameter of which is slightly greater than the largest diameter of the wood core. Any suitable rigid plastic tubing having the requisite internal diameter can be used, but clear PVC plastic is preferred. Before or after the sleeve 34 has been placed on the application tube 50, the near end is cinched together by tape or the like, as at 52 in FIG. 9. The sleeve 34 and application tube are then in condition to receive the wood core 12.

While restraining the sleeve 34 on the outside of the tube 50, the handle end 17 of the wood core 12 is pushed into the cinched end 52 of the sleeve 34 forcing the sleeve into the tube 50. This causes the sleeve 34 to draw off the outside of tube 50 and over the bat under tension as it is being pushed into the tube. This tension on the sleeve in the longitudinal direction tends to draw in the sleeve onto the handle portion 17 of the core, thus orienting the strands in the desired longitudinal direction. When the core 12 is all the way into the tube 50, the core is turned or rotated by using the barrel end support extension 28 as a handle. This turning or twisting action forces the sleeve 34 to draw in on the outer end 54 of the wood core 12. The core is turned until the sleeve draws in enough to engage the circular base 44 of the extension 28 where it meets with the outer or tip end of the core, thus completely covering the remainder of the core end 54. The first layer 36 of the sleeve 34 is now in place on the core 12.

The amount of turning of the core 12 to obtain sufficient covering of the core end 54, all the way to the base 44 of the extension 28, depends upon the characteristics of the sleeve, including density, weave tightness, etc. Using the preferred fiberglass braided sleeve as described above, the core need be turned only about one half turn to draw the sleeve 34 in fully around the core end 54. This drawing in of the sleeve to the base 44 allows the core to be withdrawn from the tube without the sleeve becoming loose or falling off, while dispensing the second layer 38 of the fiberglass sleeve 34 onto the wood core 12 as it is being withdrawn from the tube 50. Thus, it is possible to quickly and easily apply two continuous, uninterrupted layers 36 and 38 of the high strength sleeve 34 to substantially the entire outer surface of the core 12 without separating the layers. In effect, second layer 38 is simply doubled back over the first layer 36. Additional layers can be applied either singly or in pairs in the same way by simply repeating the method described above. Further, the tubular sleeve could be continuously fed to the tube 50 from the non-working end.

When the wood core 12 has been withdrawn from the tube 50, the sleeve 34 is cut leaving several inches extending past the support extension 26 at the end of the core. The end 41 of sleeve layer 38 is then tensioned with respect to the core 12 in order to draw the sleeve down around the handle portion 17 of the core and orient the strands 40 and 42 of layer 38 into the desired locking orientation for the handle portion 16 of the bat, as described above. The tensioning can be readily accomplished by holding the outer end 41 of layer 38 and turning the core by support extension 28 as a handle. Further, the tubing is drawn tightly to the base of the knob 21 to draw the sleeve down around the knob end. This is readily accomplished by placing a small piece of plastic PVC tubing 39 over the end 41 of layer 38 and stud 26, and then pulling tightly on the braid end as the PVC tubing moves against the base of the knob 21. The end 41 of the braid layer 38 is then folded over and taped (not shown).

Further tensioning of the outer layer 38 can be achieved, if necessary, by twisting tubing 39 down tighter on the base of knob 21. The preformed bat assembly 32 is now complete.

The layers 36 and 38 of the sleeve 34 are tightly bonded to substantially the entire outer surface of the core 12 in forming the bat 10 by an appropriate curable resin. Any curable resin can be used which tightly bonds the fiberglass layers to the wood core and does not exhibit any fracturing, breaking, or shattering when impacted with hitting a ball, or otherwise. Further, since the reinforced bat of the present invention is intended to emulate a standard wood bat in appearance, a clear resin is preferred. Thus, the curable resin for the present invention is selected for clarity, fracture toughness, impact, interlaminer and interfacial adhesion, and high modulus to dissipate energy laterally.

The preferred resins for the present invention are thermoset epoxy resins which self-cure at or near room temperature. The epoxy component is preferably based on 2,2'-(1,3-phenylene) bis-2-oxazoline. Other difunctional and multifunctional epoxy resins, with or without monofunctional diluents, may also be used. Applicable converters, or hardeners, to form the thermoset epoxy resin include multifinctional primary and secondary amines, Lewis acids, Lewis bases, dibasic carboxylic acids and anhydrides, and the like. The preferred hardeners include alkyl amines, such as diethylenetriamine, triethylenetetramine, metaxylenediamine, α-aminoethyl piperazine, and the like. Polyoxypropyleneamines, amidoamines, polyamides, and cycloaliphatic polyamines could also be used as a total converter or as a blend. The mix ratio would be approximately stoicheometric (except for Lewis acids and bases), consisting of one active amine hydrogen for every epoxy group. In addition to the epoxy component and the amine hardener component, a third component is preferably incorporated which precipates out during cure and forms a discrete second phase. This second phase is in the nature of small elastomeric balls, preferably less than 1 micron in diameter, encapsulated and bonded to the continuous epoxy phase. This second phase enhances fracture toughness, impact resistance, and improves the composite's resistance to premature delamination. The preferred resin materials are manufactured and sold by Applied Polymeric Inc. of Benicia, Calif.

In order to assist in bonding a preferred epoxy resin to the wood bat core, a primer is preferably applied to the wood bat core before the fiberglass sleeve layer or layers are applied. The primer is selected to penetrate the wood and act as a coupler or interface between the wood core and the fiberglass. The preferred primer compositions are epoxy resin emulsions which exhibit low toxicity, low cost, long pot life, good wood penetration, Tg>60° C., and low viscosity. A single component thermoplastic epoxy, having a molecular weight of about 30,000 with appropriate coalescing and penetrating solvent, is especially effective. A two part epoxy, where the part B contains blends of alkyl amines, amidoamines and emulsifying surfactants may be satisfactory, but are not as preferred due to their two components and limited pot life. Further examples of primer compositions include resorcinol formaldehyde, urea formaldehyde and aqueous solutions of polyethylenimine hydroxymethylated resorcinol. The preferred primer is also manufactured and sold by Applied Polymeric.

Figure 6:
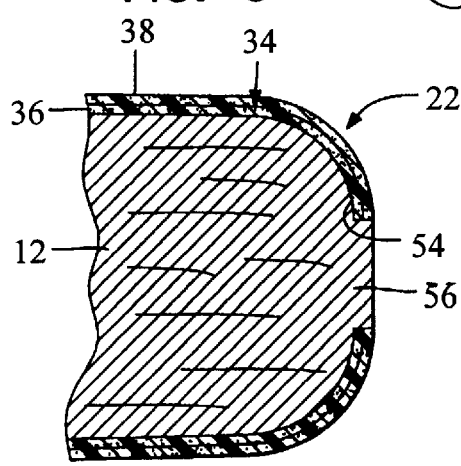
FIG. 6 is a fragmental sectional view of the barrel or tip end of the bat illustrating the substantial covering of the tip end of the bat with the reinforcing composite laminant.
Figure 7:
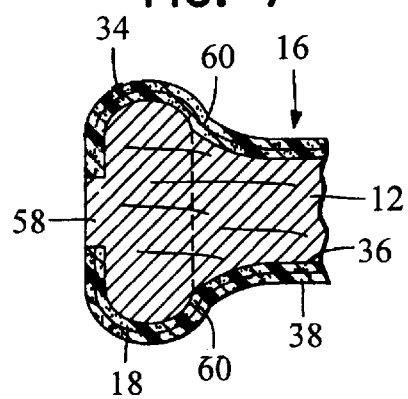
FIG. 7 is a fragmental sectional view of the handle end of the bat illustrating the substantial covering of the knob of the bat with the reinforcing composite laminant.

The enlarged sectional views in FIG. 6 and 7 illustrate the intimate bonded and laminated relationship between the layers of composite material sleeve 14 and the surfaces of the 10 wood core 12 forming the reinforced bat. As illustrated, the layers 36 and 38 of sleeve 34 cover the entire outer surface of the bat 10 except for portion 56 in the outer end 22 and portion 58 in the base of knob 18 where lathe extensions 28 and 26, respectively, have been removed in the finishing of the bat 10. Further, reinforcement of the knob 18 is not necessary in accordance with the present invention. Therefore, the reinforcing layers 36 and 38 can be cut at 60 where the knob 18 merges into the bottom of the handle portion 16. In such event, extension 26 is cut to be flush with the base of the knob 18 when finishing the bat. In accordance with this invention, therefore, the reinforcing layers of the fiberglass sleeve continuously cover the entire outer surface of the bat 10 from at least the point where the knob merges with the handle 16 up to portion 56 at the outer tip of the bat. This continuous, uninterrupted covering is more than 99% of the entire bat surface, not including the knob 18.

One conventional method for bonding and laminating the fiberglass sleeve layers to the wood core is illustrated in FIGS. 12, 13 and 14. The preformed bat assembly 32 is placed in a mold 62 including a bottom half 64 and a top half 66 each of which includes one half of a cavity 68 receiving the preformed bat assembly 32. The mold components are conventional and, when closed, an appropriate heat curable thermosetting or thermoplastic resin is injected through injection port 70 to fill the cavity 68 and fully impregnate the fiberglass sleeve layers 36 and 38 with the resin. The mold cavity and preformed bat assembly 32, including the resin impregnated layers 36 and 38, are subjected to heat and pressure with the heat being at a temperature to melt and fuse the resin and securely bond and laminate the sleeve layers to the wood core and also retain the fiberglass strands in the handle portion 16 in the described favorable orientation as indicated by reference numeral 48 and in the barrel portion 14 in the diagonal mesh relation as indicated by reference numeral 46. One known resin injection molding technique is disclosed in Seki U.S. Pat. No. 5,301,940, except that the molds must be reconfigured to accommodate the end support extensions 26 and 28.

It is also part of the present invention to utilize a novel method for applying and curing an epoxy resin, such as the preferred epoxy resins described above, in order to fix the fiberglass sleeve layers to the wood core. However, in utilizing the preferred epoxy resins, a primer, such as a preferred epoxy primer as described above, should be applied to the wood core 12 before the fiberglass sleeve layers. The resin primer is applied after the wood core 12 is preferably heated to about 110° F. The heating serves not only to drive out the air from the wood core, but also assists the penetration of the primer into the wood. Once heated, the wood core is dipped into the epoxy primer composition. After drying, the wood core is preferably dipped a second time in the primer composition, but this time without heating. The wood core is now primed for receiving the epoxy resin during the curing and molding operation.

In accordance with the present invention, a unique molding technique has been discovered which facilitates the bonding and laminating of the fiberglass sleeve layers to the wood core in a more expeditious and less expensive technique than prior processes. This preferred molding technique involves the heat shrinking of conventional plastic tubing in close fitting contact with the preformed bat assembly to serve as a mold for application and curing of the epoxy resin. This molding technique will now be described by reference to illustrative FIGS. 15, 16 and 17 in which the plastic tubular mold is generally designated by the numeral 72.

In order to form the requisite tubular mold 72, a properly sized hollow tube 74 is placed on the barrel end of the assembly 32 over the extension 28. The tube 74 includes an elongated tube portion 76 and a short tube portion 78 dimensioned to fit closely over extension 28. The tube portion 78 over the extension 28 has a smaller diameter than tube portion 76. Large tube portion 76 forms the open spout 80 for the mold 72, while short tube portion 78 forms the circular opening 81 (see FIG. 16) from the spout 80 into the mold surrounding the preformed bat assembly. Generally, a 1½ inch cardboard hollow tube having a length of about 20 inches has been found satisfactory for the tube portion 76. The shorter tube portion 78 can be easily affixed to the inside of the cardboard tube portion 76. The base of the tube 74 is placed in an appropriate stand (not shown) which supports the tube 74 in a standing vertical position. The preformed bat assembly 32 is then supported on the tube 74 by inserting the support extension 28 in the tube portion 78.

Figure 15:
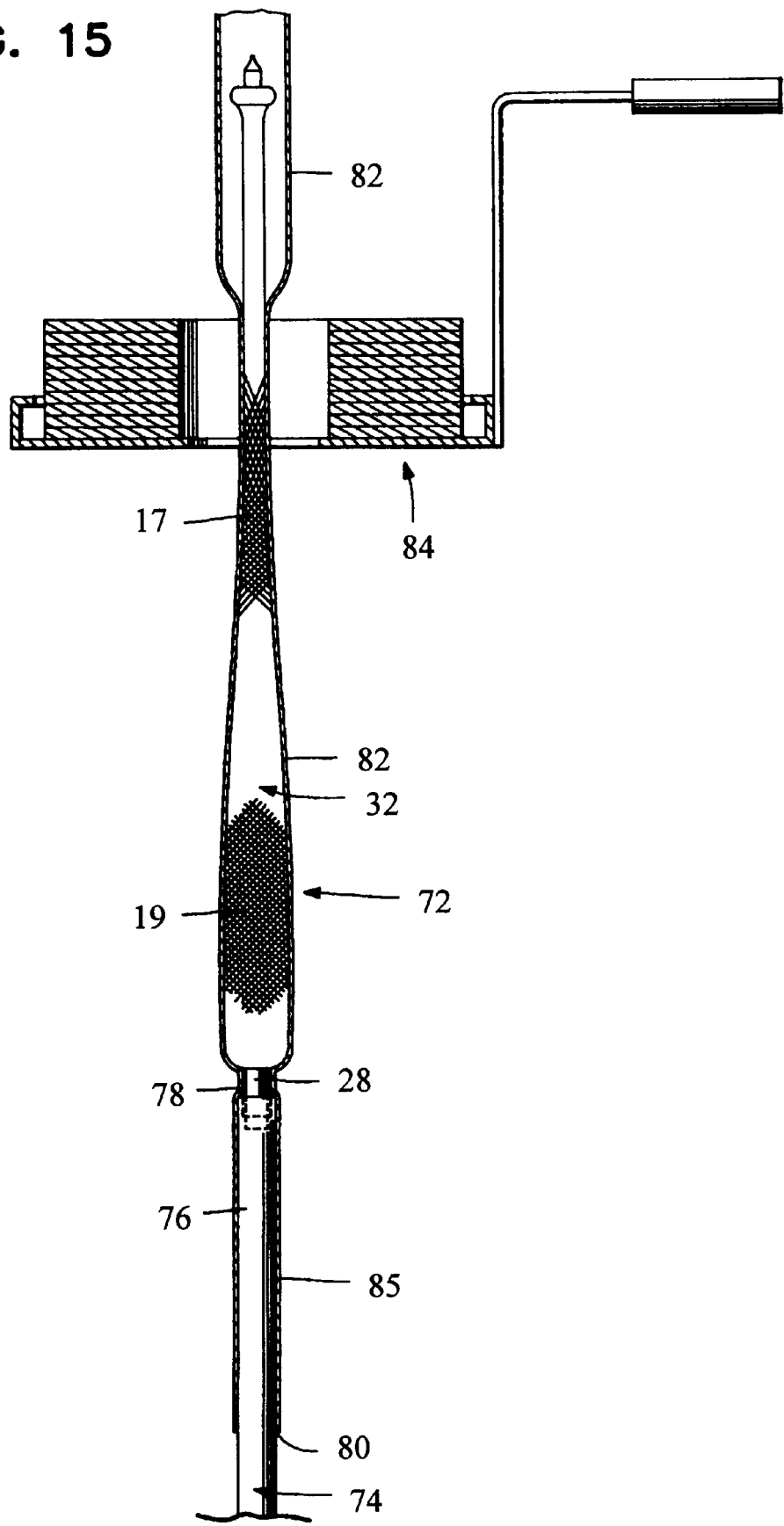
FIG. 15 is a side elevational view illustrating schematically an apparatus to simultaneously stretch and shrink a high shrink thermoplastic tubing during the formation of the plastic tubular mold.

A high shrink tubing 82 having a lay flat width of about four inches is then applied over both the preformed bat assembly and the tube 74. Thin wall PVC high shrink tubing has been found satisfactory for tubing 82. The high shrink tubing 82 is then shrunk down into close fitting contact with the outer fiberglass sleeve layer using an annular radiant heater 84 or the like. Preferably, the radiant heater 84 moves automatically, starting at the bottom of tubing 82 and moving upwardly over the preformed bat assembly 32 starting at the outer end. As shown in FIG. 15, the annular radiant heater 84 has moved substantially up the assembled structure past the tube 74, the barrel portion 19 and into the handle portion 17 of the preformed bat assembly 32. As shown, the high shrink tubing 82 has shrunk down into close fitting contact with the tube 74 as well as the preformed bat assembly 32. A suitable opening is provided for the air in the tubing to escape as tubing 82 is shrunk down on the tube 74 and preformed bat assembly 32. Once the radiant heater has made a complete pass over the assembled structure, and the tubing 82 has been shrunk around the knob end 18, the hollow tube 74 is then removed leaving the preformed bat assembly 32 encased in a plastic heat shrunken skin which forms the plastic tubular mold 72 with a long open tube extension 85 at the barrel end 54.

Because there is a significant differential between the diameters of the handle portion 16 and the barrel portion 20 of the bat, it has been discovered that the method of shrinking the mold tubing down onto the handle portion of the preformed bat assembly requires simultaneous stretching and heating of the plastic mold tubing during the heat shrinking process. This has been found desirable in order to sufficiently shrink the mold tubing around the handle portion of the bat. The simultaneous stretching of the tubing during the heat shrinking process in the handle portion 16 of the bat can be achieved by any suitable technique. However, one simple method is to release the support of the tube 74 and, therefore, the assembled preformed bat assembly thereon when the annular radiant heater 84 has risen approximately three quarters of its upward course, thus leaving the preformed bat assembly 32 and tube 74 with that portion of the tubing 82 heat shrunk, thereon to freely hang with respect to the remainder of the tubing 82 which is supported from above. This gravity force on the unshrunk tubing 82 causes it to stretch as it is being heat shrunk by radiant heater 84 onto the handle portion.

After the tube 74 has been removed from tube extension 85, the preformed bat assembly 32 within the plastic tubular mold 72 is now ready to receive the preferred epoxy resin 86. The components are brought to an ambient temperature environment. The epoxy resin components are then mixed and poured into the hollow tube extension 85 through open spout 80. Using the preferred epoxy resin, it has been found that about seven ounces of the mixed resin are sufficient. Preferably, an elongated piece of ash wood 88, about 1 inch square and 14 inches long, is inserted into the tube to act as a heat sink. This piece of ash wood serves to slow the exothermic reaction of the epoxy resin and increase the amount of working time or "pot life, of the resin. The open end 80 of the hollow tube extension 85 is then placed over and locked down over a capture fixture 90 to pressurize the air pressure in the tube extension and plastic tubular mold. This head pressure forces the resin to wet-out the fiberglass sleeve layers in the preformed bat assembly in a reasonable period of time without premature curing. Preferably, an air pressure of about 10 psi is applied, which causes the preferred epoxy resin to completely traverse the length of the supported preformed bat assembly 32 and plastic tubular mold 72, such that resin begins to drip out of the opening 92 of the molding at the handle end of the assembly 32, in approximately 30 to 40 minutes. As shown in FIG. 16, the epoxy resin has wetted out approximately the top one quarter of the preformed bat assembly 32 at a level designated by the numeral 94. This pressurization of plastic tubular molds is a form of composite manufacturing known in the art under the name "Resin Transfer Molding".

It has been found that an ambient temperature of about 80–82° F. is an optimum temperature for applying and curing the epoxy resin. Any lower ambient temperature undesirably increases the viscosity of the resin causing excessively long wet out time. A significantly higher ambient temperature will cause undesirable exothermic reaction of the epoxy, thus destroying the formed bat.

After the preformed bat assembly 32 has been wetted out, it can be turned upside down and held by a fixture 96 which holds the bat just below the knob 18. (See FIG. 17.) By so doing, the uncured resin and fiberglass better fill the handle/knob interface. Preferably, the fitting 96 is shaped and heated to a temperature above 200° F. so as to form a permanent ring at the interconnection between the top of the knob and the base of the handle portion 16 of the bat 10. This holding step can be eliminated if the fiberglass sleeve layers have been effectively saturated during the resin transfer molding step described above.

Once the epoxy resin has cured, which should take approximately 1½ to 2 hours, the tubular mold 72 comprising the heat shrink wrap is removed. The support extensions 26 and 28 are cut off and the exposed bat ends are dressed. The handle can then be either sand blasted or sanded to give it a rougher texture. While the foregoing preferred embodiments have been described above using one or more layers of a conformable fabric sleeve made of high strength glass fibers, or fiberglass, it is believed that fabric sleeves made from other high tensile strength fibers, such as Kevlar, Spectra, carbon, nylon and the like, can be used in the present invention. Further, one or more ends or strands of such other high strength fibers can be braided, woven, knitted or formed into a conformable sleeve along with the fiberglass strands or ends within the scope of this invention. Hence, it is not intended that the present invention be limited to sleeves, braided or otherwise, made solely from glass fibers.

In addition, the particular wood from which the wood core 12 is formed can be a matter of choice. High quality ash wood is customarily used to make quality wood bats, and such wood can be used in the present invention. However, lower grade ash wood may also be used for the wood core 12 in view of the surprisingly high superior reinforcing capability of the laminated fiberglass sleeve 14 of the present invention.

Figure 18:
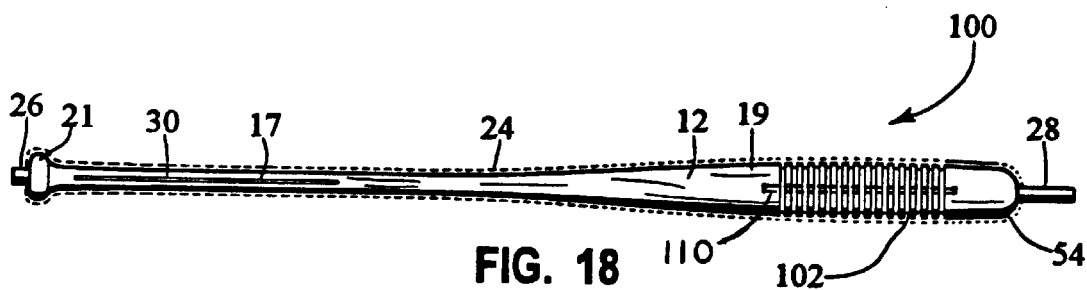
FIG. 18 is an elevational view of a wood core for a modification of the bat of FIG. 2 with the broken line illustrating the original size of a conventional standard size wood bat, the bat having a plurality of circular grooves in the barrel.
Figure 19:
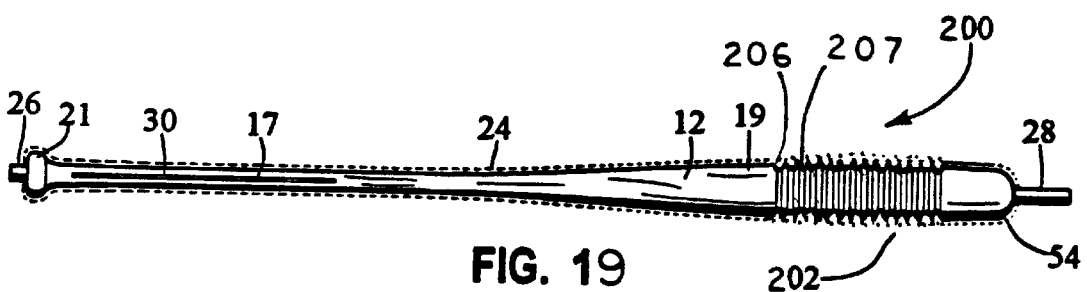
FIG. 19 is an elevational view of a wood core for a modification of the bat of FIG. 18 with the broken line illustrating the original size of a conventional standard size wood bat, the bat having a plurality of circular grooves in the barrel, the grooves having radiused edges.

Finally, the embodiments of FIGS. 18 and 19 teach modified bats 100 and 200, respectively. Bat 100 of FIG. 18 includes a plurality of circular grooves 102 therein. As shown, there are fifteen grooves each having a width of about 3/16 inch and a depth of about 0.100±0.010 inch. A strip portion of the barrel about 3/16 inch wide remains between each pair of grooves. Also shown is a longitudinal groove 110. Another corresponding groove 110 is on the opposed side of the bat 100. These two grooves 110 have a width of about 1/32 inch and a depth about the same as the grooves 102. Grooves 102 function to force air out of the grooves 102 as the resin is flowing from the barrel end toward the knob end, similar to the four grooves 30 in the handle end. Because the weave is not as tight in the barrel end and the resin flow is faster in the barrel end, it is thought that only two grooves 110 are needed in the barrel end, as compared to four grooves 30 in the handle end with the tighter weave and slower resin flow.

Bat 200 of FIG. 19 includes a plurality of grooves 202 in the barrel end, similar to grooves 102 of bat 100. However, grooves 202 include radiused edges outside (206) and inside (207). If the bat were cross-sectioned along its lengthwise axis, the grooves 202 would have a sine wave like appearance. (Bat 100 of FIG. 18 would have a square wave appearance in similar cross-section.) If a line were drawn along the barrel surface, the top of the strip between each of the pair of grooves 202 would touch the line. Bat 200 is shown without longitudinal grooves 110 of bat 100. With the sine wave shape, a separate air channel is not required to force the air out of the grooves 202. Further, the flowing resin will more readily fill the grooves 202. However, if desired, grooves 110 can be provided.

Bats 100 and 200 are made the same way as bat 10 described earlier. There is just more resin in the barrel end to help extend the life of the wood in the hitting zone of the bat. With bats 100 and 200, 100 parts of Applied Polymeric CR-58 epoxy and 28 parts of Applied Polymeric HB-3 hardener are combined. One hundred grams of the mixture is used in a mold for a bat and approximately 80–90 grams actually flow through a bat.

The foregoing is considered as illustrative of the principles of the invention. Numerous other modifications and changes will occur to those skilled in the art. Hence, it is not desired to limit the invention to the exact construction and operation shown and described. All suitable modifications and equivalents may be resorted to, falling within the scope of the invention as presented.

What is claimed is:

1. A reinforced wood bat having external dimensions of a standard size wood bat which comprises a wood core including a handle portion and a barrel portion defining an elongated member having external dimensions slightly less than the external dimensions of a standard size wood bat and one or more continuous layers of a sleeve of reinforcing fibers impregnated with a curable resin laminated to and covering a substantial portion of an external surface of said wood core, said one or more layers having a thickness to increase the external dimensions of the wood core to final dimensions of the reinforced wood bat substantially identical to the external dimensions of said standard size wood bat, said handle portion of the wood core includes a plurality of longitudinally extending grooves symmetrically spaced about the handle portion of the bat.

2. The reinforced wood bat as defined in claim 1, wherein said sleeve is constructed of strands of said fibers.

3. The reinforced wood bat as defined in claim 1, wherein a major portion of said fibers are constructed of glass fibers.

4. The reinforced wood bat as defined in claim 2, wherein said fiber strands are oriented in the barrel portion of said bat about +45°/−45°.

5. The reinforced wood bat as defined in claim 4, wherein said fiber strands are oriented in the handle portion of said bat at substantially below +45°/−45°.

6. The reinforced wood bat as defined in claim 5, wherein said oriented fiber strands are in a substantially locked condition in the handle portion of the bat.

7. The reinforced wood bat as defined in claim 3, wherein said glass fiber sleeve is present in two continuous layers each covering substantially the entire external surface of the wood core.

8. The reinforced wood bat as defined in claim 1, wherein one or more layers cover in excess of 99% of the external surface of said wood core from a base of the handle portion to an outer end of the bat.

9. The reinforced wood bat as defined in claim 1, wherein said bat includes a knob at an end of the handle portion and said at least two layers each covers a substantial portion of the knob.

10. The reinforced wood bat as defined in claim 1, wherein the external surface of said wood core is impregnated with an emulsion primer which bonds with said curable resin during lamination of the one or more sleeve layers to the wood core.

11. A reinforced wood bat having external dimensions of a standard size wood bat which comprises a wood core including a handle portion and a barrel portion defining an elongated member having external dimensions slightly less than the external dimensions of a standard size wood bat and one or more continuous layers of a sleeve of reinforcing fibers, a major portion of said fibers being constructed of glass fibers impregnated with a curable resin laminated to and covering a substantial portion of a external surface of said wood core, said one or more layers having a thickness to increase the external dimensions of the wood core to final dimensions of the wood bat substantially identical to the external dimensions of said standard size wood bat, said sleeve being present in two continuous layers each covering substantially the entire external surface of the wood core, wherein said two continuous layers are also continuous with respect to each other with the outer layer doubled back over the inner layer.

12. A reinforced wood bat, having external dimensions of a standard size wood bat which comprises a wood core including a handle portion and a barrel portion defining an elongated member having external dimensions slightly less than the external dimensions of a standard size wood bat and one or more continuous layers of a sleeve of reinforcing fibers impregnated with a curable resin laminated to and covering a substantial portion of a external surface of said wood core, said one or more layers having a thickness to increase the external dimensions of the wood core to final dimensions of the reinforced wood bat substantially identical to the external dimensions of said standard size wood bat where said bat includes a plurality of circular grooves in said barrel end.

13. The reinforced wood bat of claim 12, where said grooves and said barrel have transverse transitions.

14. The reinforced wood bat of claim 12, where said grooves and said barrel have radiused edge transitions.

15. A reinforced wood bat having external dimensions of a standard size wood bat which comprises a solid wood core including a handle portion and a barrel portion defining an elongated solid wood member having external dimensions slightly less than the external dimensions of a standard size wood bat and one or more continuous layers of a sleeve of strands of reinforcing fibers impregnated with a curable resin laminated to and covering substantially an entire external surface of said wood core, said one or more layers having a thickness to increase the external dimensions of the wood core to final dimensions of the reinforced wood bat substantially identical to the external dimensions of said standard size wood bat, wherein said fiber strands are oriented in the barrel portion of said bat about +45°/−45° and said fiber strands are oriented in the handle portion of said bat at substantially below +45°/−45°, and wherein the handle portion of the wood core includes a plurality of longitudinally extending grooves symmetrically spaced about the handle portion of the bat.

16. The reinforced wood bat as defined in claim 15, where said bat includes a plurality of grooves in said barrel end.

* * * * *